United States Patent [19]
Hanson et al.

[11] Patent Number: 6,032,975
[45] Date of Patent: Mar. 7, 2000

[54] ERGONOMIC WHEELCHAIR SEAT

[75] Inventors: Wayne H. Hanson; Robert C. Huntley; Jerry Riekenberg, all of Bozeman, Mont.

[73] Assignee: Sunrise Medical HHG Inc., Longmont, Colo.

[21] Appl. No.: 08/748,017

[22] Filed: Nov. 12, 1996

[51] Int. Cl.⁷ .............................. B62B 1/00; B62M 1/14
[52] U.S. Cl. ...................................... 280/647; 280/250.1
[58] Field of Search ................................ 280/647, 250.1, 280/304.1; 297/284.9, 317, 354.12, 452.48, 452.55, DIG. 4

[56] References Cited

U.S. PATENT DOCUMENTS

| | | | |
|---|---|---|---|
| 4,655,741 | 4/1987 | Peek | 280/250.1 |
| 5,524,971 | 6/1996 | Jay et al. | 297/354.12 |
| 5,636,900 | 6/1997 | Wilkie et al. | 297/440.14 |

*Primary Examiner*—Christopher P. Ellis
*Assistant Examiner*—Faye M. Fleming
*Attorney, Agent, or Firm*—MacMillan, Sobanski & Todd, LLC

[57] ABSTRACT

A wheelchair seat assembly (16) including a seat (30,36), and back rest assembly (49). Back rest assembly (49) includes lateral pelvic supports (52) for carrying pelvic bolster pads (62), an outer shell piece (50) and an inner shell piece (28) adjustably secured to each other, torso supports (76) and a head rest assembly (88). Outer shell piece (50) has a deep concave shape while inner shell piece (28) has a shallow concave shape, which creates a gap (120). Gap (120) provides space for receiving torso supports (76) and head rest assembly (88) in a manner that these two components can be adjusted without interfering with the back rest cushion and without causing discomfort for the user.

30 Claims, 7 Drawing Sheets

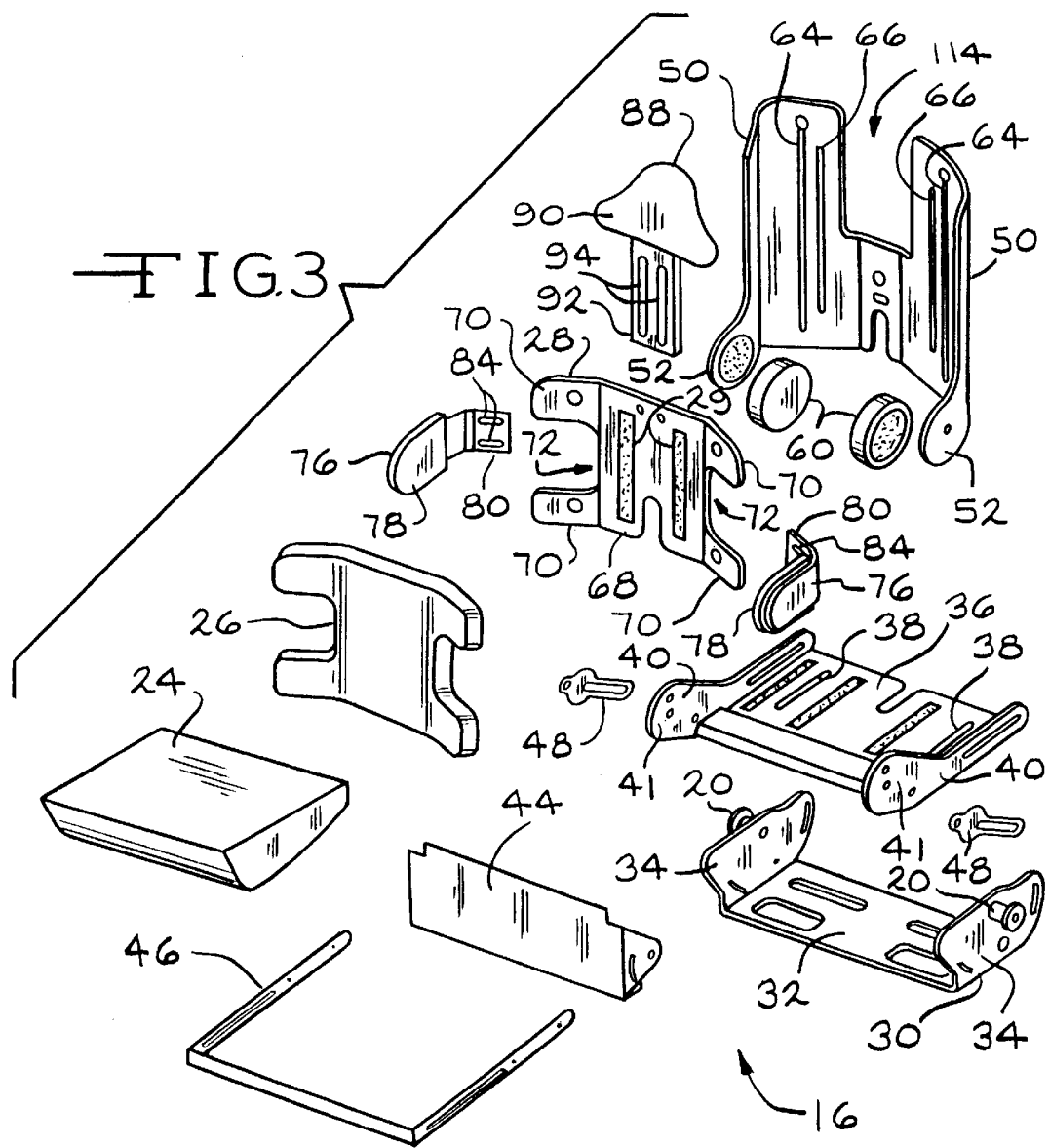

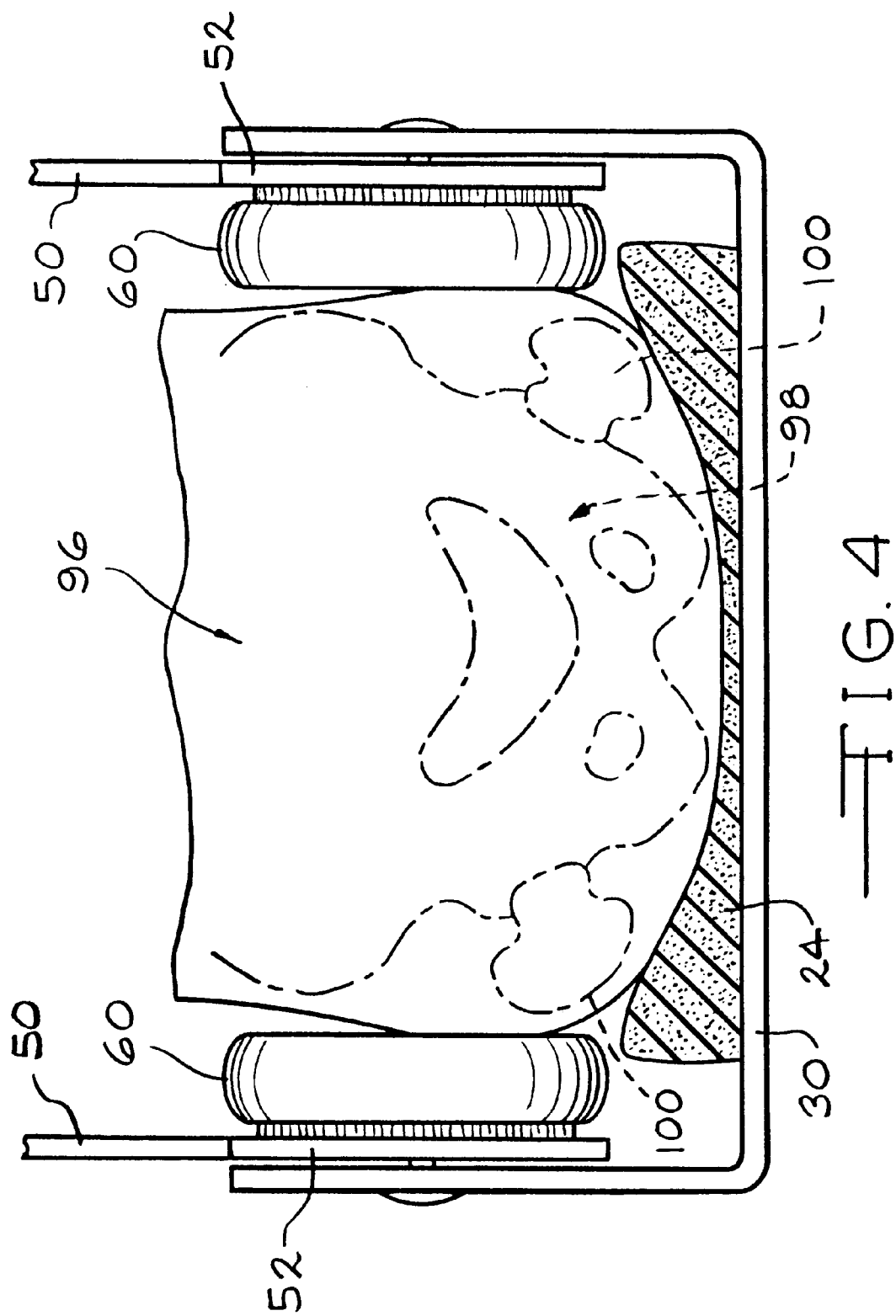

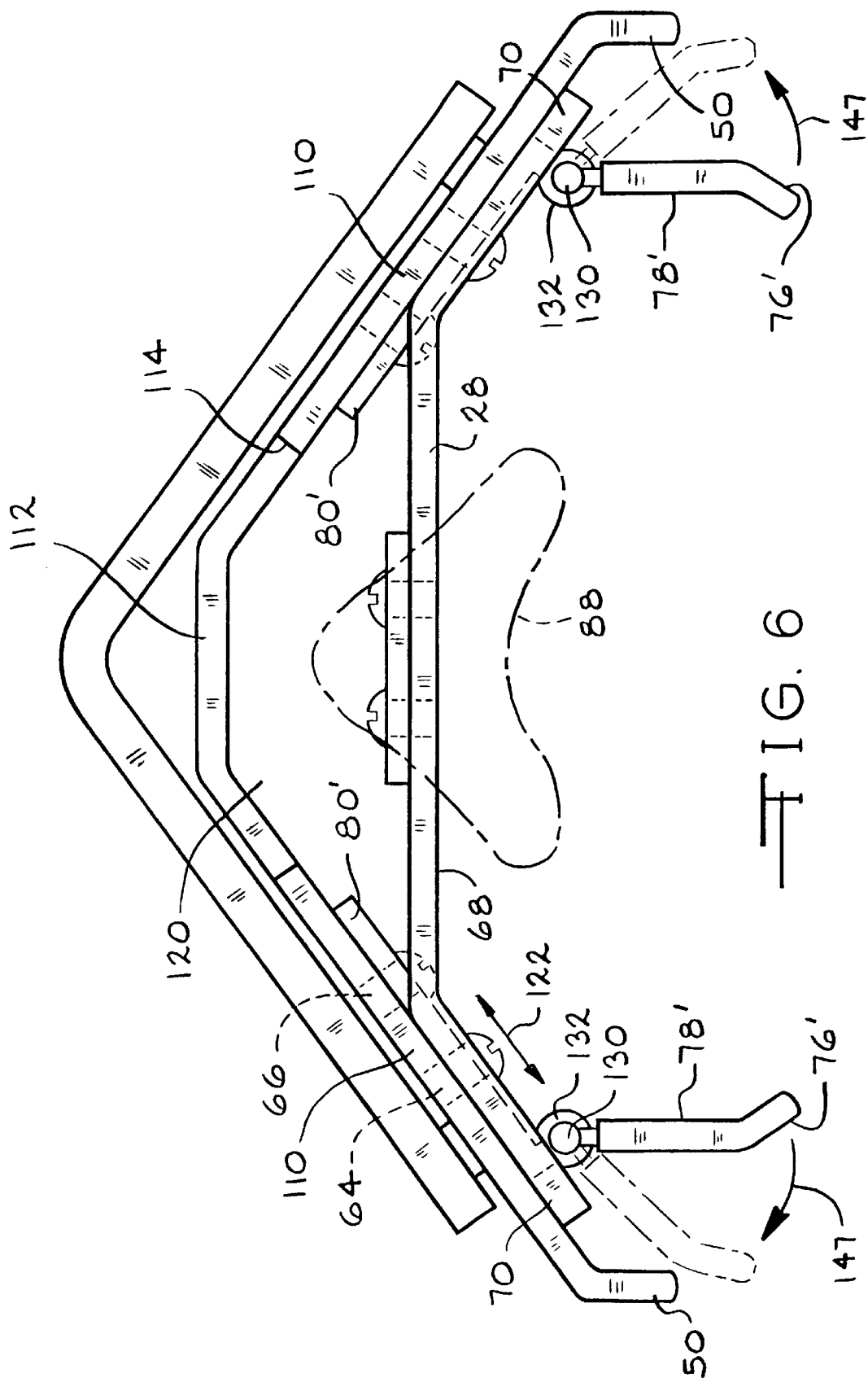

ERGONOMIC WHEELCHAIR SEAT

TECHNICAL FIELD

The present invention pertains to wheelchair seats and, more particularly, to wheelchair seats with adjustable features to accommodate growing children and persons of different sizes and proportions.

BACKGROUND ART

Wheelchair designs have been greatly improved in recent years in the area of user comfort, support and ease of use. Wheelchair back rests recline, and foot rests are adjustable. Wheelchair seats are detachable, and wheelchair frames are foldable. Various seat cushion designs have been employed to provide maximum comfort and support. For a person confined to a wheelchair for substantial periods of time or permanently, most of these design features greatly facilitate use of the wheelchair. The present invention addresses many of the same concerns that underlie the foregoing wheelchair improvements—making use of a wheelchair as comfortable and effortless as possible.

A particular problem addressed by current wheelchair designs is the flexibility of the wheelchair to adjust to a young person who is still growing. When a child grows, not only does the child's overall body size grow, but the relative proportions of various body parts changes. It is highly desirable that a wheelchair be able to adjust to comfortably support a child as these changes take place.

While the wheelchair of the present invention is particularly suitable for use by children in their growing years, the wheelchair also provides utility for adults and elderly persons.

DISCLOSURE OF INVENTION

Briefly described, the present invention comprises an ergonomic wheelchair seat assembly having an improved back rest assembly, including an improved pelvic bolster support and an adjustable back rest shell.

The improved pelvic bolster support is designed for use on a wheelchair seat carried on a wheelchair frame movably supported by a set of wheels. The wheelchair includes a seat base mounted on the wheelchair frame and a back rest pivotally secured to pivot with respect to the seat base so that the angle between the back rest and the seat base can selectively be adjusted. The back rest includes a pair of lateral pelvic supports spaced apart adjacent a lower section of the back rest and adjacent the seat base. The pelvic supports are positioned laterally outwardly adjacent outer sides of the back rest. A pelvic bolster pad is secured to each pelvic support inwardly of the support, so that the two pelvic bolster pads are spaced apart a distance sufficient to accommodate a person's pelvic region. In addition, the two pads face each other so that when the person sits in the wheelchair seat, the pads press against the hip bone of the pelvic region. The pelvic bolster pads are pivotal with the back rest, so that when the person sits in the wheelchair, with the pelvic bolster pads pressed against the hip bone, the pelvic bolster pads pivot with the back rest as the back rest is pivoted to adjust the angle between the back rest and the seat base.

Provision of pivoting pelvic bolster pads provides a more ergonomic wheelchair seat. When a seated person reclines, the pelvic region pivots to allow the torso to recline relative to the legs. With the present invention, each pelvic bolster pad pivots with the pelvic region, which provides more support and comfort than a non-pivoting pad.

According to an aspect of the invention, the pelvic bolster pads are adjustably attached to the pelvic supports, so that the pads can be selectively positioned adjacent the joint of the femur and the hip bone. Preferably, the pelvic bolster pads are adjustably attached by means of mechanical fasteners that provide a multiplicity of adjustment positions.

According to another aspect of the present invention, additional pelvic bolster pads are provided to replace the first-named pelvic bolster pads. The additional pads have a thickness different from the thickness of the first-named pads. With a selection of pads of different thickness, the spacing between the pads can be adjusted to accommodate different size persons or to provide firmer support.

Preferably, the first named pelvic bolster pads and the additional pelvic bolster pads are resiliently deformable, and the additional pelvic bolster pads are softer than the first named pelvic bolster pads. This provides an alternative way of achieving different levels of support.

The adjustable back rest assembly of the present invention forms part of a wheelchair seat that is mounted on a wheelchair frame movably supported by a set of wheels. The wheelchair includes a seat base mounted on the wheelchair frame and a back rest pivotally secured to pivot with respect to the seat base so that the angle between the back rest and the seat base can be selectively adjusted. The back rest includes an outer shell piece having a deep concave profile and an inner shell piece having a shallower concave profile. The inner shell piece is adjustably mounted to the outer shell piece so that a gap is created between the two shell pieces.

The gap formed between the two shell pieces provides space for additional adjustable support components to be selectively adjusted about the shell pieces in a manner providing comfortable ergonomic support. For example, lateral torso supports are provided on each side of the back rest. The lateral torso supports are adjustably secured to the outer shell piece in a manner permitting vertical and lateral movement of the lateral torso supports. The lateral torso supports include inwardly extending portions that are adjustably secured to the outer shell piece, and which extend inwardly into the gap formed between the inner shell piece and the outer shell piece.

Preferably, the inner shell piece has an I-shape with a central back support section and four lateral extensions. The inner shell piece is secured to the outer shell piece at the four lateral extensions. The lateral extensions on each side of the inner shell piece form side gaps for receiving the lateral torso supports, which are adapted to adjust laterally within the side gaps. The side gaps have sufficient height to provide a degree of vertical adjustment of the lateral torso supports.

According to an aspect of the invention, the lateral torso supports are secured to the outer shell piece for adjustable vertical movement by means of upright slots in the outer shell piece and are secured to the outer shell piece for adjustable lateral movement by means of lateral slots in the inner shell piece. Suitable slidable bolts are received in the slots of one shell piece and are secured to the other shell piece.

Another example of an adjustable component that can be received in the gap between the inner and outer shells is a head rest. Preferably, the head rest is adjustably secured to the inner shell piece and is movable vertically within a central cut out section of the outer shell that provides space for the head rest to be selectively adjusted vertically relative to the inner shell piece.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 3 is an exploded view of the wheelchair seat of FIG. 2, with the seat and back cushions added;

FIG. 4 is a sectional view, taken along the lines 4—4 of FIG. 2, showing a person sitting in the wheelchair seat and the pelvic bolster pads engaging the pelvic region;

FIG. 6 is a top view of the back rest assembly of the wheelchair seat of FIG. 2, showing the gap between inner and outer shell pieces of the back rest.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
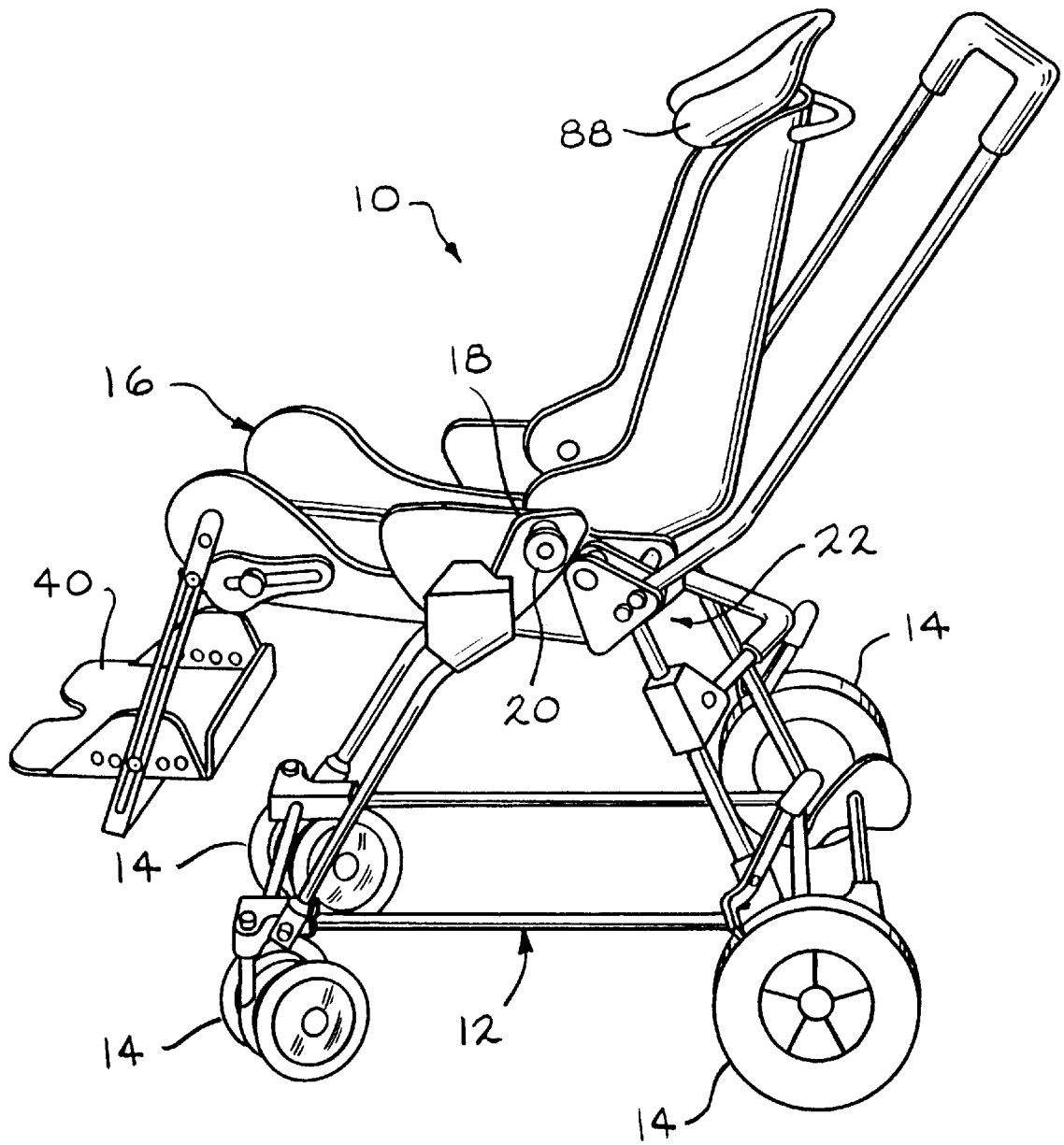
FIG. 1 is a pictorial view of the wheelchair of the present invention.

Referring to FIG. 1, a wheelchair 10 is shown constructed in accordance with a preferred embodiment of the present invention. Wheelchair 10 includes a frame assembly 12 movably supported by a set of wheels 14, and a wheelchair seat assembly 16 pivotally carried on frame 12. Frame 12 includes a pair of support sockets 18, which receive pivot arms 20 extending laterally from seat assembly 16. Seat assembly 16 pivots about pivot arms 20, in a manner permitting the recline angle of the seat to be selectively adjusted. A retainer pin and set of pin receiving openings, indicated generally by reference 22, allow a selected angle of recline to be securely set.

Figure 2:
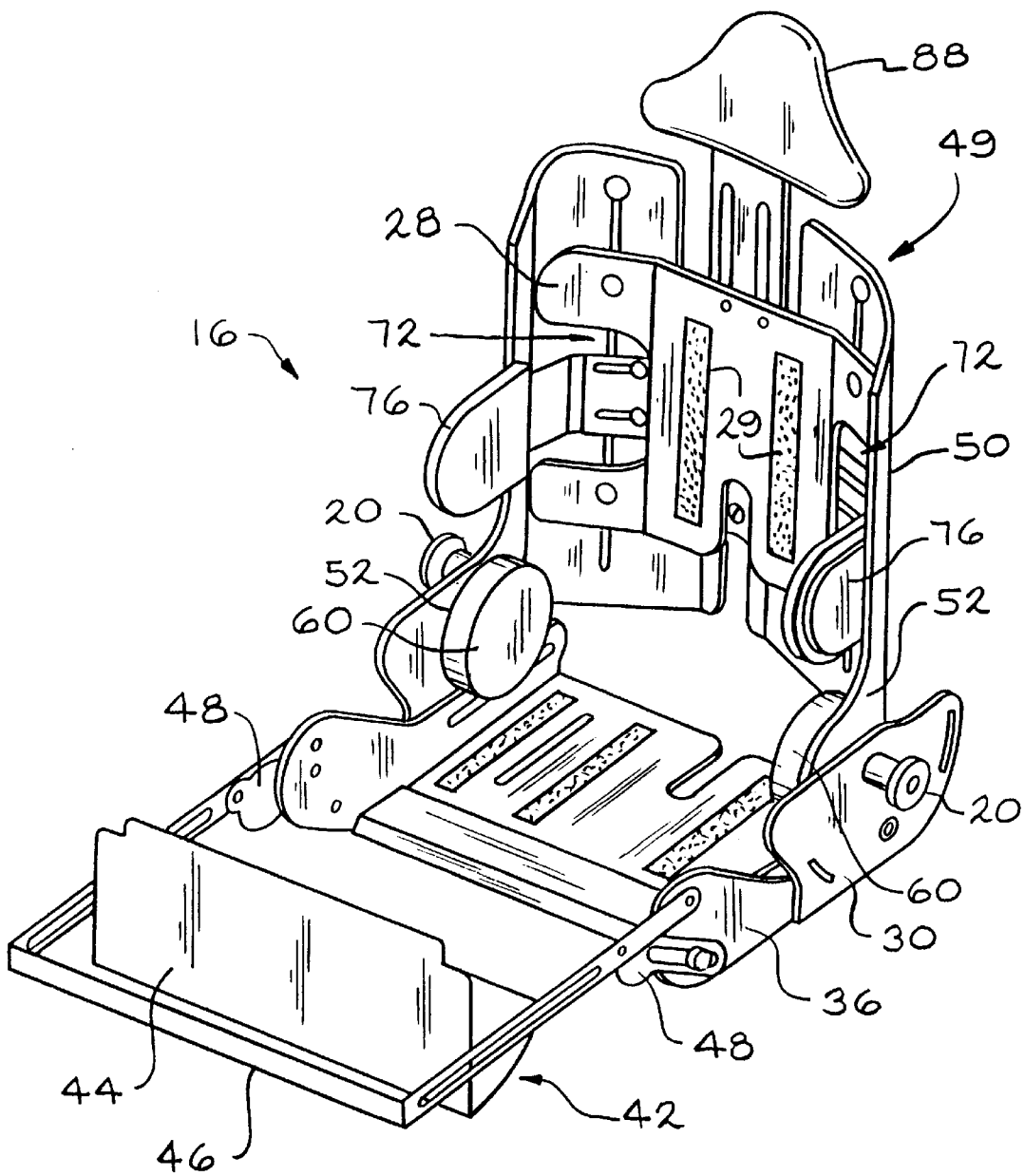
FIG. 2 is a pictorial view of the wheelchair seat of the wheelchair of FIG. 1, shown without seat and back cushions.

FIGS. 2 and 3 illustrate the design of wheelchair seat assembly 16. In FIG. 2, wheelchair seat 16, for clarity, is shown without seat and back cushions. However, FIG. 3 shows a seat cushion 24 and back rest cushion 26 that form part of the wheelchair assembly. Back rest cushion 26 is I-shaped to match the design of an inner back rest shell piece 28. Hoop and loop fasteners 29 secure back rest cushion 26 to inner shell piece 28. Seat cushion 24 is the subject of a commonly owned and concurrently filed patent application, entitled "Length Extender for Child's Wheelchair System," Ser. No. 08/748,089.

Wheelchair seat assembly 16 includes a seat assembly sub-frame 30, which includes a base 32 and upwardly extending side walls 34. Side walls 34 include pivot posts or arms 20, which form the pivot point for wheelchair seat assembly 16. A seat base 36 includes slots 38, which allow for fore and aft adjustment of the position of seat base 36 on seat sub-frame 30. Seat base 36 also includes side wall portions 40. Side wall portions 40 support lateral knee supports 41 for attaching knee pads (not shown).

A foot rest assembly 42 includes a foot rest plate 44, a support bracket 46, and a pair of angle adjustment brackets 48. Brackets 46, 48 allow for positioning of foot rest plate 44 in a multiplicity of selected locations.

A back rest assembly 49 includes an outer back rest shell piece 50 having a pair of lateral pelvic supports 52, which pivotally mount outer shell piece 50 at the inner ends of pivot arms 20. Outer shell piece 50 pivots about pivot arms 20 in order to adjust the angle between the back rest assembly 49 and seat base 36. An adjustment mechanism (not shown) is provided for securing outer shell piece 50 at a selected angle relative to seat base 36.

A pair of pelvic bolster pads 60 are adjustably and removably secured at the inner sides of pelvic supports 52 by means of Hoop and loop fasteners. Pelvic bolster pads 60 are deformable pads, preferably made of a closed cell foam enclosed in a neoprene cover. The density of the foam can be selectively varied to provide different levels of pelvic support. In addition, the thickness of pads 60 can be selectively varied to increase or decrease the spacing between the pads. In this manner, both the comfort and support of the pelvic region can be improved by proper selection of pelvic pads 60.

Outer shell piece 50 includes a pair of outer vertical slots 64 and a pair of inner vertical slots 66. Outer slots 64 allow for selective adjustment of inner shell piece 28 vertically along outer shell piece 50 by means of adjustable bolts that secure the inner shell piece to the outer shell piece. Inner shell piece 28 includes a central back support region 68, and four lateral extensions 70. The lateral extensions on each side of central region 68 define a side gap 72, the purpose of which shall be discussed later. Bolts (not shown) secure lateral extensions 70 to outer shell piece 50 at a selected point along vertical slots 64.

Herein, the term "vertical" is used to describe slots 64, 66 even though the slots may or may not be exactly vertically aligned depending on the angle of outer shell piece 50. The term "lateral" is used to describe a direction transverse to a vertical direction and transverse to a centerline that symmetrically divides the wheelchair seat in half.

A pair of lateral torso supports 76 include torso pads 78 and angle brackets 80. Angle brackets 80 include lateral slots 84. Lateral slots 84 allow for selective adjustment of torso supports 76 laterally in and out, in order to decrease or increase the spacing between torso pads 78. Bolts (not shown) adjustably secure torso supports 76 at a selected vertical position and lateral position to outer shell piece 50 via inner slots 66 therein.

A head rest assembly 88 includes a head rest pad 90 and an upright support plate 92. Plate 92 includes a pair of vertical slots 94, which allow for selective adjustment of the position of head rest pad 90 up and down on inner shell piece 28.

FIG. 4 illustrates the pelvic region 96 of a person seated on seat frame 30 and seat cushion 24 laterally between pelvic bolster pads 60. Seat base 36 is not shown in FIG. 4. Pelvic bolster pads 60 are selectively positioned on pelvic supports 52 at a position where the pads press against the hip bone 98 of pelvic region 96. The joint between the femur 100 and the socket 101 of hip bone 98 is proximate the preferred position of pelvic bolster pads 60.

Figure 5A:
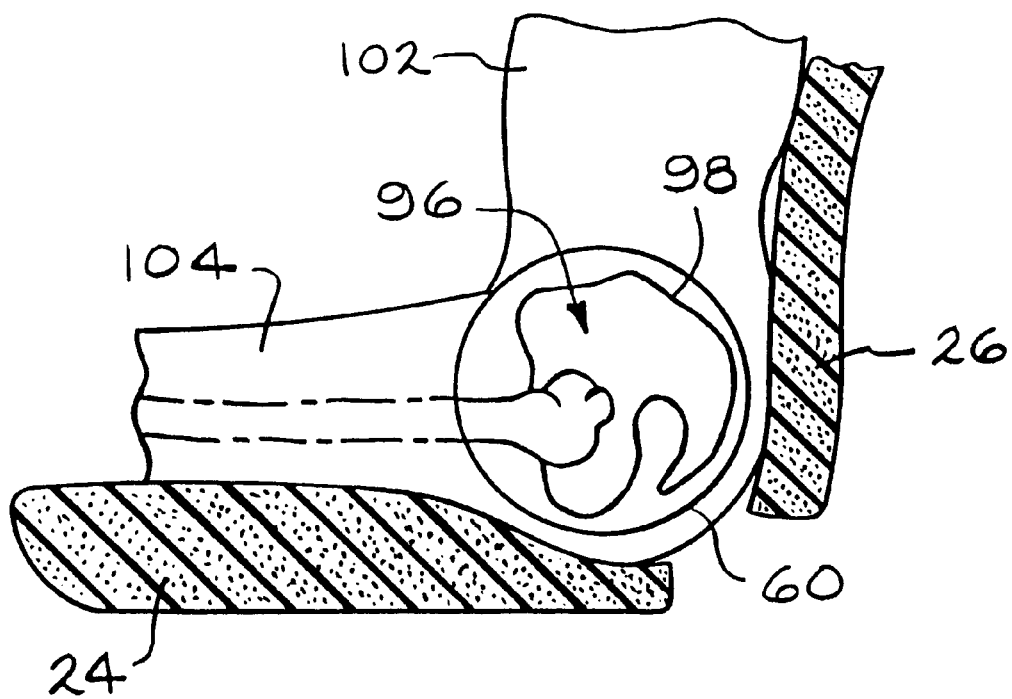
FIG. 5A is schematic view of parts of the wheelchair seat of FIG. 1, showing a person's torso region, pelvic region, and upper legs in an upright position in the wheelchair seat.
Figure 5B:
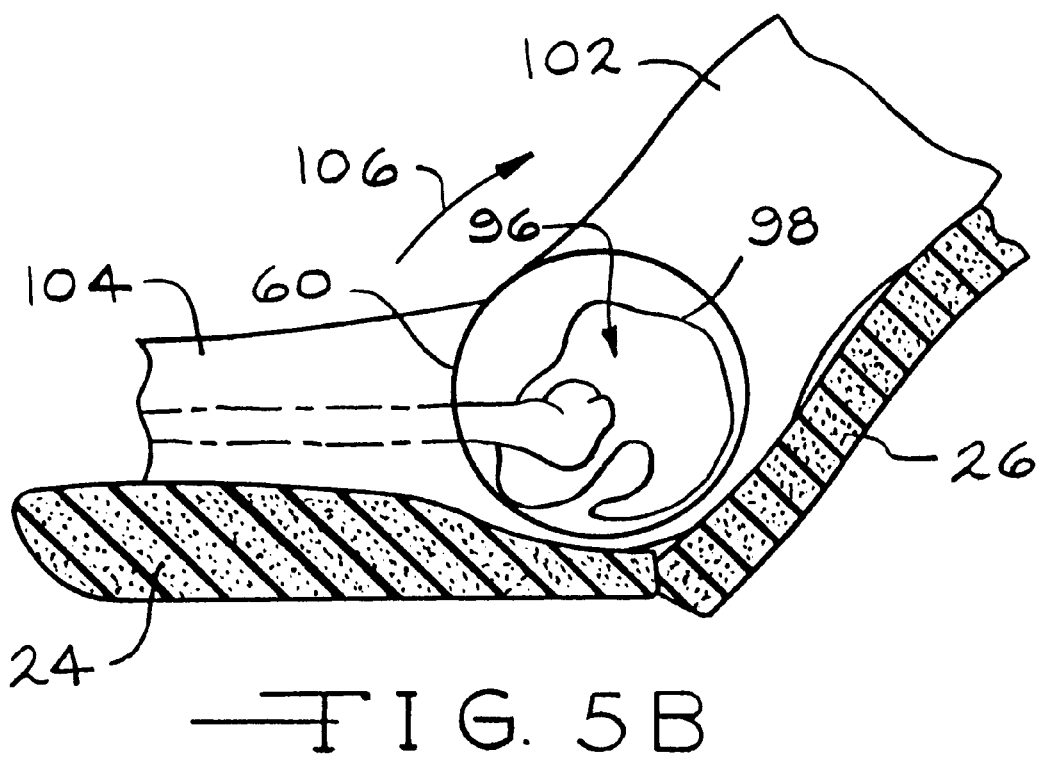
FIG. 5B is a schematic view like FIG. 5A, shown with the person in a reclined position.

FIG. 5A shows pelvic region 96, a torso region 102 and an upper leg 104 of a person seated in the wheelchair seat of the present invention. The person is shown in an upright position, with pelvic bolster pads 60 positioned at pelvic region 96. In FIG. 5B, the back rest assembly is pivoted backwardly, in the direction of arrow 106. The person's torso region 102 has pivoted about the upper legs 104, causing pelvic region 96 to rotate in the direction of arrow 106. As pelvic region 96 rotates, pelvic bolster pads 60 rotate with the pelvic region. This significantly increases user comfort and support.

FIG. 6 is a top view of back rest assembly 49. Outer shell piece 50 has a deep concave shape, including angled side wall portions 110 and a central back region 112 joining side wall portions 110. Side wall portions 110 and central back region 112 define a central cutout section 114, which provides space for adjustment of head rest assembly 88. Inner shell piece 28 has a shallow concave shape, including angled lateral extensions 70, which mate against side wall portions 110 of the outer shell piece, and central back support section 68, which spans across outer shell piece 50, forming a gap 120 therebetween.

An alternative embodiment for contoured lateral torso supports 76' is shown in FIG. 6. Contoured torso supports 76' include contoured pads 78' mounted to short vertical shafts 130, which are carried in sleeves 132. Sleeves 132 are formed integrally with mounting brackets 80', which allow for both vertical and lateral adjustment of torso pads 78' relative to inner shell piece 28. To change the spacing between torso pads 78', mounting brackets 80' are moved in the direction of arrow 122 along angled side walls 110. Angled side walls 110 are angled so that the lateral torso supports 76' are more forwardly positioned as they are further separated. Mounting brackets 80' extend inwardly behind inner shell piece 28 and into gap 120. Gap 120 provides space for receiving mounting brackets 80' during adjustment of torso supports 76'. In this manner, adjustment of torso supports 76' does not interfere with the back seat cushion or the position of inner shell piece 28. In addition, the spaces 72 (FIG. 1) defined between the lateral extensions 70 of inner shell piece 28 provide space for vertical adjustment of torso supports 76'. This again provides a simple adjustment mechanism for the torso supports that does not interfere with the back rest cushion and, hence, does not create any discomfort for the user.

Figure 7:
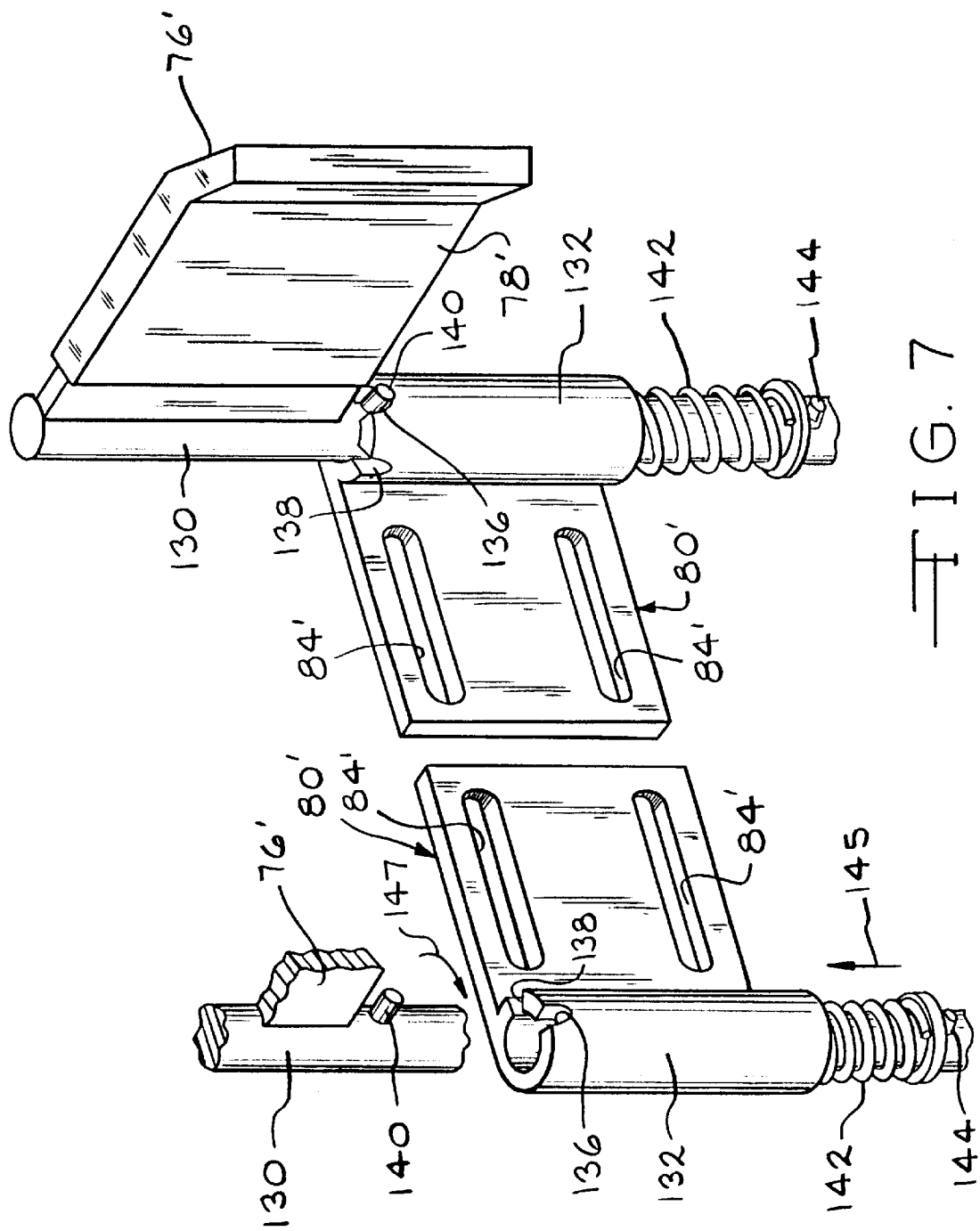
FIG. 7 is a pictorial view of an alternative embodiment of the contoured lateral torso supports.

FIG. 7 illustrates the design of the second embodiment of torso supports 76'. As shown in FIG. 7, mounting bracket 80' includes a pair of lateral slots 84' that provide for lateral adjustment of bracket 80'. Vertical adjustment is provided via the inner vertical slots in the back shell piece. One end of bracket 80' forms sleeve portion 132. A pair of upwardly facing notches 136, 138 are formed at the upper edge of sleeve 132. Slot 136 is located at the forward edge of sleeve 132, while slot 138 is located inwardly of slot 136. Short vertical shafts 130 are carried in sleeves 132. An alignment pin 140 is secured to each shaft 130. Pin 140 seats either in slot 136, which positions contoured torso pad 78' in a forwardly oriented direction and in position to support a person's torso section, or in slot 138, which positions pad 78' in an inwardly folded position. The wheelchair seat of the present invention is designed to fold up when not in use, and the folded position of contoured pads 78' assisted in this regard.

Each vertical shaft 130 is spring biased downwardly into a selected slot by a coil spring 142. The upper end of springs 142 engage brackets 80' while the lower end of springs 142 engage lugs 144. To seat a person in the wheelchair, contoured pads 78' are pulled upwardly, against the force of springs 142, in the direction of arrow 145, and are swung outwardly, in the direction of arrow 147, allowing the person to rest against the back rest cushion. Then the pads 78' are swung inwardly until shafts 130 seat into slots 136, wherein they are held in a lateral position and provide support to the torso region.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto when read and interpreted according to accepted legal principles such as the doctrine of equivalents and reversal of parts.

What is claimed is:

1. A wheelchair seat assembly, comprising
   a frame movably supported on a set of wheels,
   a seat base mounted on the frame,
   a back rest assembly pivotally secured to pivot about the seat base, so that the angle between the back rest assembly and the seat base can be selectively adjusted, the back rest assembly including
   (1) an inner shell for supporting a back rest cushion and an outer shell, the inner shell being vertically adjustable on the outer shell,
   (2) torso supports on each side of the outer shell, the torso supports being laterally and vertically adjustable on the outer shell, and
   (3) a head rest assembly vertically adjustable on the inner shell piece.

2. The wheelchair seat assembly of claim 1, and further comprising lateral pelvic supports on the outer shell, the lateral pelvic supports providing support to a person's pelvic region, the lateral pelvic supports being pivotal with the outer shell.

3. A wheelchair seat for use on a wheelchair, comprising
   a seat base mounted on the wheelchair frame,
   a back rest pivotally secured to pivot with respect to the seat base so that the angle between the back rest and the seat base can be selectively adjusted, the back rest including an outer shell piece an inner shell piece, the inner shell piece adapted to carry a back rest cushion and being adjustably mounted to the outer shell piece in order to adjust the vertical position of the back rest cushion relative to the seat base,
   lateral torso supports mounted to the outer shell piece for vertical and lateral adjustment, the lateral torso supports having forward positions adapted to provide support to a person's torso and a folded position that facilitates folding of the wheelchair.

4. The wheelchair seat of claim 3, wherein the lateral torso supports have spring biased seated positions wherein the lateral torso supports are urged into their seated positions.

5. The wheelchair seat of claim 4, wherein the lateral torso supports are adapted to be unseated from their forward and folded seated positions and swung inwardly and outwardly.

6. The wheelchair seat of claim 3, wherein the outer shell piece includes angled side walls, and the lateral torso supports are adjustably mounted to the angled side walls, so that lateral adjustment of the torso supports is along an angle.

7. The wheelchair seat of claim 6, wherein the angled side walls are angled so that the lateral torso supports are more forwardly positioned as the lateral torso supports are further separated.

8. A wheelchair comprising:

a frame;

a plurality of wheels movably supporting the frame, a seat assembly mounted on the frame, a back rest assembly including a pair of laterally spaced pelvic supports at a lower section of the back rest assembly, the pelvic supports being pivotally mounted to the seat assembly :o that the pelvic supports and the back rest assembly pivot relative to the seat assembly about a common pivot axis, and a pelvic bolster pad secured to each pelvic support inwardly of the pelvic support, the pelvic bolster pads being pivotable with the pelvic supports, whereby the pelvic bolster pads may pivot with a wheelchair occupant's pelvic region.

9. The wheelchair of claim 8 wherein the seat assembly includes a seat frame having a base and upwardly extending side walls each including a pivot pin, the pelvic supports being pivotally mounted to inner ends of the pivot pins.

10. The wheelchair of claim 9 wherein the seat assembly further includes a seat base which is adjustable fore and aft on the seat frame.

11. The wheelchair of claim 8 wherein the seat assembly further includes a seat frame and a seat base on the seat frame, the seat base having a seat cushion secured thereto.

12. The wheelchair of claim 11 wherein the seat cushion is secured to the seat base by a hook and loop fastener.

13. The wheelchair of claim 8 wherein the back rest assembly further includes an inner back rest shell piece secured to an outer back rest shell piece so as to form a gap between the inner back rest shell piece and the outer back rest shell piece.

14. The wheelchair of claim 13 further including a head rest assembly.

15. The wheelchair of claim 14 wherein the outer back rest shell piece has a deep concave shape and includes angled side wall portions and a central back region joining the side wall portions, the side wall portions and the central back region defining a cutout section, the cutout section providing a space for adjustment of the head rest assembly.

16. The wheelchair of claim 13 wherein the inner back rest shell piece is selectively adjustable relative to the outer back rest shell piece.

17. The wheelchair of claim 13 wherein the inner back rest shell piece includes a central back support region and at least one lateral extension on each side of the central back support region.

18. The wheelchair of claim 13 wherein the inner back rest shell piece includes a central back support region and at least two lateral extensions on each side of the central back support region defining side gap therebetween for a torso support.

19. The wheelchair of claim 18 wherein each torso support includes a bracket and a torso pad.

20. The wheelchair of claim 19 wherein each bracket is selectively adjustable laterally to increase and decrease spacing between the torso pads.

21. The wheelchair of claim 20 wherein the outer back rest shell piece includes angled side wall portions and the brackets are brackets so that the torso supports are positioned more forwardly as the torso supports are further separated laterally.

22. The wheelchair of claim 20 wherein the torso supports extend behind the inner back rest shell piece into the gap between the inner back rest shell piece and the behind the outer back rest shell piece so adjustment of the torso supports does not interfere with the back rest seat cushion.

23. The wheelchair of claim 19 wherein the bracket is selectively adjustable vertically.

24. The wheelchair of claim 18 wherein the torso supports are contoured torso and the torso pads are contoured.

25. The wheelchair of claim 18 wherein the wheelchair is designed to fold up and the torso pads are adapted to fold into a folded position.

26. The wheelchair of claim 13 further including a back rest cushion secured to the outer back rest shell piece.

27. The wheelchair of claim 26 wherein the back rest cushion is secured to the outer back rest shell piece by a hook and loop fastener.

28. The wheelchair of claim 8 wherein the pelvic bolster pads are removably secured to the pelvic supports.

29. The wheelchair of claim 8 wherein the pelvic bolster pads are selectively positioned on the pelvic supports at a position where the pelvic bolster pads may press against the hip bones of a wheelchair occupant.

30. The wheelchair of claim 8 wherein the seat assembly is selectively adjustable relative to the back rest assembly to position the pelvic bolster pads at the joint between the wheelchair occupant's femur and the socket of the wheelchair occupant's hip bone.

* * * * *